United States Patent

Ngo-Beelmann

[11] Patent Number: 5,718,512
[45] Date of Patent: Feb. 17, 1998

[54] HIGH-TEMPERATURE PROBE

[75] Inventor: Ung Lap Ngo-Beelmann, Karlsruhe, Germany

[73] Assignee: Asea Brown Boveri AG, Baden, Switzerland

[21] Appl. No.: 587,972

[22] Filed: Jan. 17, 1996

[30] Foreign Application Priority Data

Mar. 11, 1995 [DE] Germany .......... 195 08 916.2

[51] Int. Cl.[6] .......... G01K 13/02; G01K 1/08; G01K 1/14; G01K 7/04
[52] U.S. Cl. .......... 374/148; 136/230; 374/179; 374/135; 374/138
[58] Field of Search .......... 374/148, 138, 374/135, 179; 136/230

[56] References Cited

U.S. PATENT DOCUMENTS

| | | | |
|---|---|---|---|
| 1,869,151 | 7/1932 | Jeffery et al. | |
| 2,525,361 | 10/1950 | Lamb | 374/138 |
| 2,820,839 | 1/1958 | Schunke | 374/148 |
| 2,970,475 | 2/1961 | Werner | 374/138 |
| 2,971,997 | 2/1961 | Carrico | 374/138 |
| 3,623,367 | 11/1971 | Benedict | 374/135 |
| 5,180,227 | 1/1993 | John et al. | 374/135 |
| 5,427,452 | 6/1995 | Stuart | 374/179 |

FOREIGN PATENT DOCUMENTS

| | | | |
|---|---|---|---|
| 0153661 | 9/1985 | European Pat. Off. | 374/138 |
| 1 015 238 | 9/1957 | Germany. | |
| 1287332 | 1/1969 | Germany | 374/135 |
| 2 413 909 | 10/1974 | Germany. | |
| 25 49 619 | 5/1977 | Germany. | |
| 27 11 112 | 9/1978 | Germany. | |
| 41 16 450 | 9/1994 | Germany. | |
| 0190621 | 12/1966 | U.S.S.R. | 374/138 |
| 0734702 | 8/1955 | United Kingdom | 374/148 |
| 1006655 | 10/1965 | United Kingdom | 374/138 |
| 1150396 | 4/1969 | United Kingdom | 374/148 |

Primary Examiner—Diego F.F. Gutierrez
Attorney, Agent, or Firm—Burns, Doane, Swecker & Mathis, L.L.P.

[57] ABSTRACT

In a high-temperature probe (1) which is used in particular in a hot-gas flow (24) up to about 1550° C., a sensor tube (19) and a support tube (6) are in each case arranged in an inner bore (2a, 2b) of a probe tube (2). The bore (2a) for the sensor tube (19), in which a temperature sensor (34) is arranged, ends in a throughflow passage (3b) for the hot-gas flow (24). The bore (2b) for the support tube (6) ends in an enlarged bore (4) of the probe tube (2), in which enlarged bore (4) a ring (8) of the support tube (6) is arranged. The support tube (6) and the sensor tube (19) project through bores (12a, 31a) of a flange (13) into a region called the plenum (27), a screw (18) being screwed in place in an internal thread (11) at the tip (28) of the support tube (6). A preloaded spring (17) which holds the high-temperature probe (1) together in a flexible manner sits between this screw (18) and a flange (14) which is connected to the flange (13) via a tubular socket (12).

9 Claims, 2 Drawing Sheets

HIGH-TEMPERATURE PROBE

TECHNICAL FIELD

The invention relates to a high-temperature probe.

German Offenlegungsschrift 2 413 909, for example, discloses such a high-temperature probe.

PRIOR ART

During the operation of gas turbines it is usually necessary to measure the temperature of the hot combustion gases, which may range between a few 100° C. up to 1550° C. For this purpose, high-temperature probes have already been proposed which can be inserted into corresponding openings in the hot-gas casing of the turbine and project with a probe tube, which contains the actual measuring element at the bottom end, into the hot-gas flow.

Thus publication U.S. Pat. No. 5,180,227 discloses an optically functioning high-temperature probe in which an optical sensor element made of sapphire is arranged in a measuring space formed at the bottom end of the probe tube. The measuring space is connected to the surrounding hot-gas space via an inlet opening made below the sensor element and an outlet opening made at the level of the sensor element. The gas entering through the inlet opening from the hot-gas flow is decelerated on account of the arrangement in the measuring space and flows around the sensor element at very low velocity before it discharges again through the outlet opening. The measuring space is therefore also designated as stagnation chamber. The probe can be used up to temperatures of 1300° C. and is cooled in the top part of the probe tube by means of air or another gas which is fed at the probe flange and let out again just above a thermal barrier which separates the sensor element from the top part of the probe.

Furthermore, German Offenlegungsschrift 2 413 909 mentioned at the beginning discloses a high-temperature probe for use in gas-turbine aircraft engines at temperatures up to 800° C., which high-temperature probe works with a thermocouple as temperature sensor. The thermocouple, in a metal-sheathed cable having mineral insulation, is run downwards in a probe tube and through a sealing constriction into a measuring space so that the connecting point between the two wires of the thermocouple is arranged approximately in the centre of the measuring space. Here, too, an inlet opening made below the connecting point and an outlet opening made above the connecting point are provided for the contact with the hot gases to be measured, which inlet and outlet openings connect the measuring space to the surrounding hot-gas space. In this case, too, therefore, the hot gas is retained and steadied by the arrangement and design of the openings in the measuring space.

In the known probes, the hot gas to be measured is greatly decelerated in its flow velocity and is brought into contact with the respective sensor element in a virtually static state. The convective heat transfer between gas and sensor element is thereby reduced, which becomes noticeable in an increased time constant and an increased deviation between actual and measured temperature.

DESCRIPTION OF THE INVENTION

The object of the invention is to further develop a high-temperature probe of the type mentioned at the beginning to the effect that the heat transfer between gas and temperature sensor is improved and to specify a suitable design of temperature probe for use at temperatures up to 1550° C.

This object is achieved by the present invention.

Optimum heat transfer between gas and sensor element is achieved by the special configuration of the measuring space as a flow passage, the hot gases being able to flow through this flow passage and around the sensor tip virtually unimpeded, which heat transfer at the same time reduces the disturbing secondary effects such as heat conduction via the probe tube and the like.

A preferred embodiment of the probe according to the invention is distinguished by the fact that the throughflow passage is defined laterally by walls of the probe tube, which form a protective radiation shield. In this way, the disturbing effects of the ambient on the measuring result can be further reduced.

It is especially advantageous for the probe tube to be made of an SiC or $Al_2O_3$ ceramic. Furthermore, it is advantageous for the tube (called sensor tube below), which is arranged in this probe tube and encloses the sensor element, to be produced from a pure $Al_2O_3$ ceramic, since the measurement with thermocouples, for example, is not affected by $Al_2O_3$ at high temperatures. The said ceramics are thermally stable even at higher temperatures than the temperatures to be measured.

If the probe tube, by means of assembly aids, is flexibly arranged on a hot-gas casing by a cooled support tube made of an oxide-dispersion-strengthened superalloy, the long-term stability of the measuring arrangement is substantially improved. Such a superalloy, which has a high chrome and aluminium proportion on an iron basis, is available, for example, under the designation PM 2000 from PM Hochtemperatur-Metall GmbH (material no. 1.4768).

With the use of the materials referred to for the probe tube, sensor tube and support tube, the high-temperature probe has a long life on account of high creep resistance and very good oxidation and corrosion resistance of the materials.

BRIEF DESCRIPTION OF THE DRAWING

The invention will be described below with reference to an exemplary embodiment in the drawing, in which.

Figure 1:
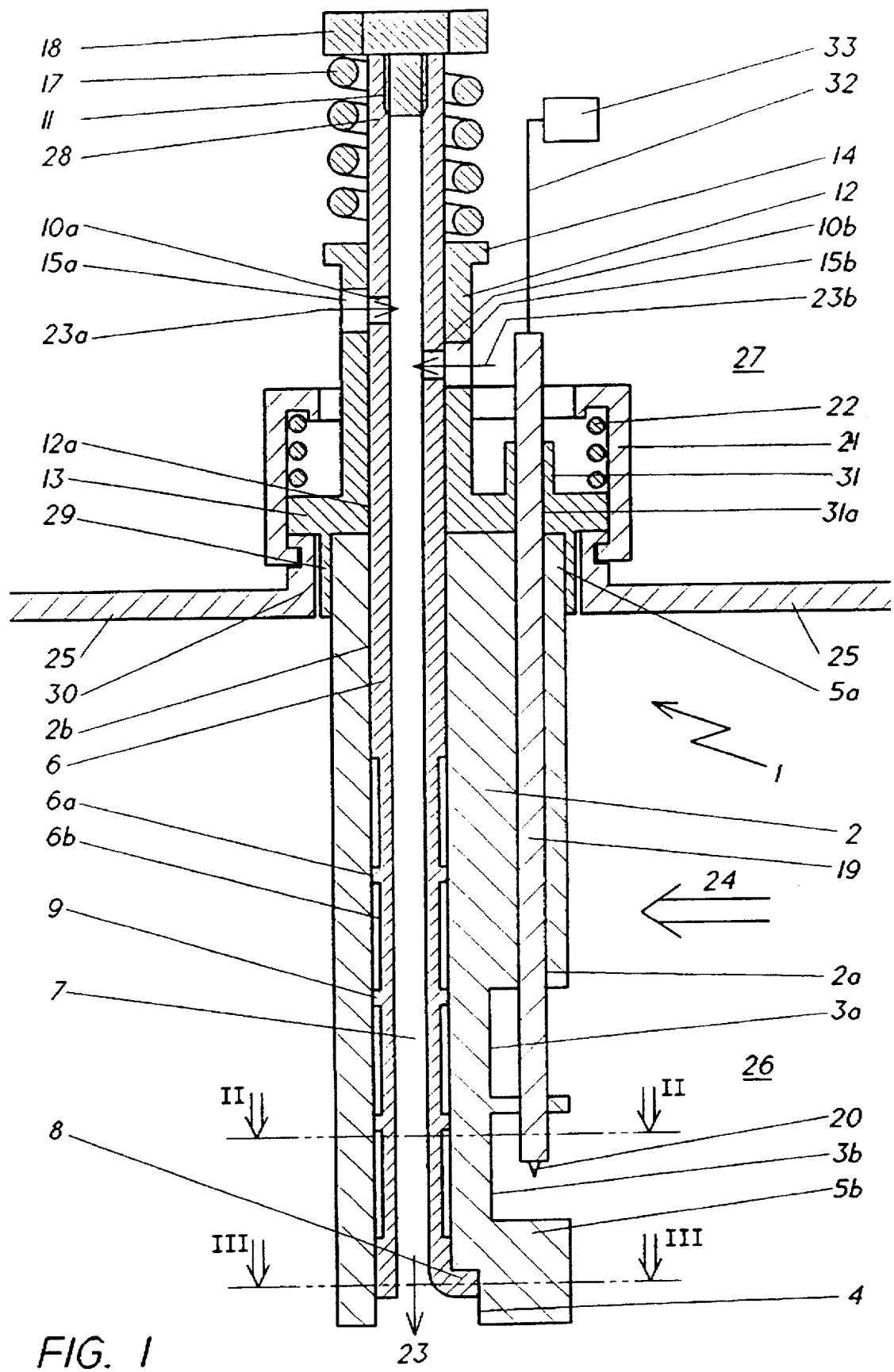
FIG. 1 shows the construction of a high-temperature probe in longitudinal section.

Only the elements essential for understanding the invention are shown. Directions of flow of the working media are represented by arrows.

WAYS OF IMPLEMENTING THE INVENTION

Before the invention is explained in more detail with reference to the drawings, first of all the working conditions in a typical gas turbine to which a high-temperature probe of the present type is exposed are to be outlined:

Wall temperature of a hot-gas casing: 900° C.

Temperature of the combustion air in the plenum: 400° C.

Hot-gas temperature: up to 1500° C.

Gas pressure: 30 bar

Gas velocity: 150 m/s

In order to permit precise measurements of the gas temperature with at the same time high long-term stability under these extreme working conditions, to which vibrations and other mechanical loads are added, a special design of the high-temperature probe is necessary, as will be explained with reference to an exemplary embodiment in the drawing.

The construction of a high-temperature probe 1 is shown in longitudinal section in FIG. 1, which high-temperature probe essentially comprises a probe tube 2 having two bores 2a and 2b which run parallel to the tube axis and in which a sensor tube 19 and a support tube 6 are arranged.

The probe tube and the sensor tube are made of an $Al_2O_3$ ceramic which is temperature-stable even above the hot-gas temperature of up to 1500° C. to be measured. However, the material is sensitive to mechanical loading, for which reason constructional measures are required in order to avoid brittle fracture of these tubes. The material used for the support tube is a superalloy which has a high chrome and aluminium proportion on an iron basis and is commercially obtainable, for example, under the designation PM 2000 from PM Hochtemperatur-Metall GmbH (material no. 1.4768). This material has a life of 24000 hours at a temperature of 1000° C. The superalloy has very good mechanical properties up to about 1200° C. on account of the high creep and corrosion resistance, but cannot be loaded thermally to as high a degree as the abovementioned $Al_2O_3$ ceramic. With the use of suitable cooling, which is described below, the good mechanical properties of the support tube 6 are utilized in a complementary manner with the good thermal properties of the probe tube 2.

The bores 2a, 2b start at the tip 5a of the probe tube 2. Mere, the bore 2b runs through the entire probe tube 2 and leads into an enlarged bore 4; the bore 2a ends in a second throughflow passage 3b which is arranged below a first throughflow passage 3a in the region of the foot 5b of the probe tube 2. The tip 5a of the probe tube 2 is inserted into a tubular socket 29 of a flange 13, which separates a hot-gas zone 26 from a region 27, which is called plenum below.

Figure 3:
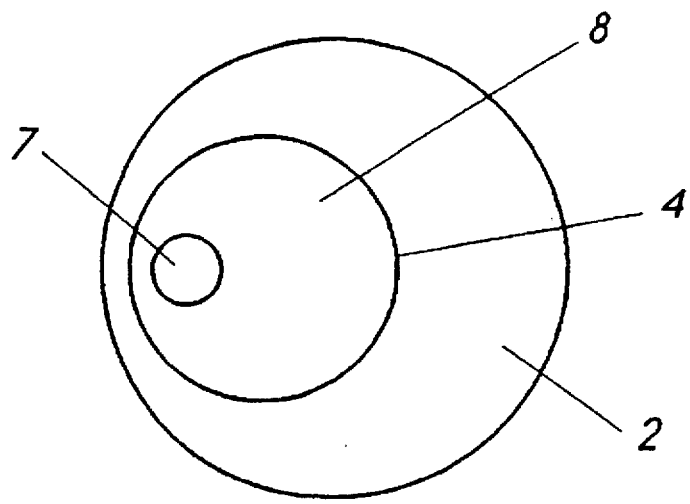
FIG. 3 shows a section through the high-temperature probe along line III—III according to FIG. 1.

On the side facing the plenum 27, the flange 13 has two tubular sockets 12 and 31 whose associated bores 12a and 31a in the flange 13 face the corresponding bores 2a and 2b of the probe tube 2 in an aligned manner. The tubular socket 12 terminates with a flange 14 and has air-inlet openings 15a and 15b below this flange 14. Arranged in the tubular socket 12 is a support tube 6, whose tip 28 in the region of the plenum 27 is provided with an internal thread 11. The support tube 6 is arranged through the bores 12a and 2b up to the enlarged bore 4 and, as FIG. 3 shows, the ring 8 is disposed in the bore eccentric to the support tube axis. The ring 8 is preferably at an end of the support tube 6 in the hot gas zone 26. The diameter of the ring 8 is preferably greater than the diameter of the bore 2b for the support tube 6, and the ring is rranged in the enlarged bore 4 at the end of the probe tube 2. In the region of the tubular socket 12, the support tube 6 has air-inlet openings 10a, b which are placed radially adjacent to the air-inlet openings 15a, b of the tubular socket. 12. The air-inlet openings 10a, b lead to an inner bore 7 of the support tube 6, as a result of which a connection is produced in the form of a flow passage for a cooling-air flow 23, 23a, 23b between the plenum 27 and the hot-gas zone 26. In the plenum 27, the compressed air flowing there is at a temperature of about 400° C. and has a positive pressure of about 1 bar relative to the hot-gas flow 24. Therefore a cooling-air flow 23a, b flows through the support tube 6 and cools it.

The support tube 6 has alternating outside diameters 6a and 6b over its length in the region of the probe tube 2 and thereby forms supporting rings 9 with which the support tube is supported against the bore 2b of the probe tube 2. This arrangement reduces the contact area for heat transport between support tube and probe tube. Therefore the temperature of the hot gas to be measured remains largely unaffected by the cooling-air flow 23, and the support tube in turn can also only absorb a reduced amount of heat from the probe tube 2.

A loaded helical compression spring 17 between a screw 18 screwed into the internal thread 11 and the flange 14 holds together the temperature probe 1 on the flange 13 by means of spring force which is transmitted to the probe tube 2 via the ring 8 of the support tube 6. A bayonet catch 21 having a helical compression spring 22 fixes the flange 13 to the opening 30 in a hot-gas casing wall 25, the probe tube 2 entering into the hot-gas zone 26. The fastening of the temperature probe 1 is thus effected outside the hot-gas casing and therefore permits servicing without dismantling the hot-gas casing. On account of the good mechanical material properties up to 1200° C., the flange 13 having the tubular sockets 12, 29 and 31 is likewise made of a superalloy, which can be used without specific cooling at a regular temperature of the hot-gas casing wall 25 of about 900° C.

Starting from the region of the plenum 27, the sensor tube 19 passes through the tubular socket 31, the bore 31a in the flange 13, the bore 2a in the probe tube 2 and the throughflow passage 3a and ends with a sensor tip 20 in the throughflow passage 3b. In this arrangement, the throughflow passages 3a, b are orientated towards the hot-gas flow 24.

Figure 2:
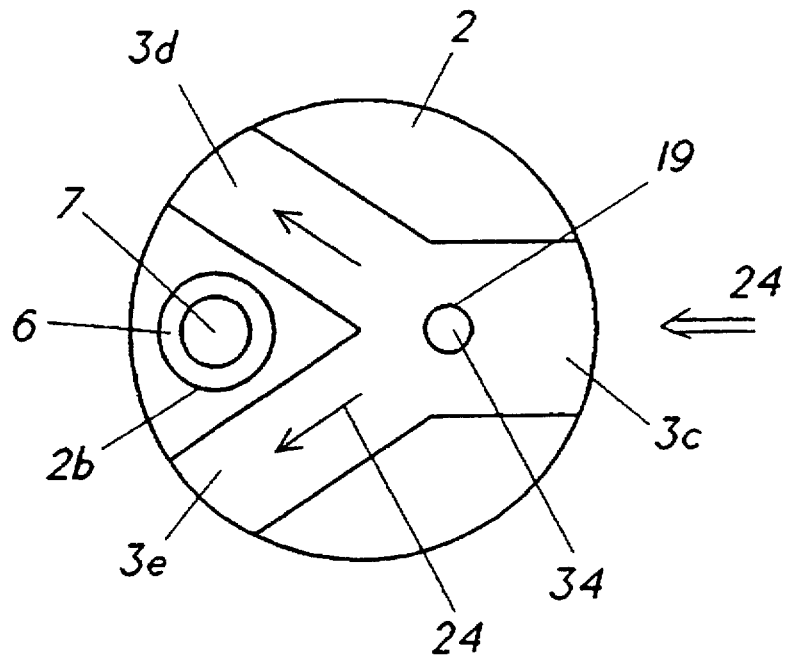
FIG. 2 shows a section through the high-temperature probe along line II—II according to FIG. 1.

With reference to a plane of section along line II—II in FIG. 1, FIG. 2 shows the Y-shaped plan view of the throughflow passages 3a, b. 3c shows an inflow passage, which is orientated towards the hot-gas flow 24, and 3d, e show outflow passages, which are arranged at an angle to the direction of the hot-gas flow at the side of the bore 2b for the support tube 6.

The sensor tip 20 is arranged in the centre of the inflow passage 3c; therefore the inflow passage forms a protective shield against heat radiation, for example from the hot-gas casing wall 25. The hot-gas flow 24 to be measured flows virtually unimpeded and without loss of velocity around the sensor tube 19 and the sensor tip 20 in the throughflow passages 3a, b. Therefore the heat from the hot-gas flow 24 is given off quickly and effectively to the sensor tip 20, a thermocouple 34 being used here as the sensor, which is designed as a type B PtRh thermocouple having a wire diameter of about 0.5 mm. A heat time constant of τ<<1 s is achieved with this selected arrangement. At the same time, the difference between the actual and the measured gas temperature is kept small.

A turbine-casing leadthrough for the extension wires 32 coming out of the sensor tube 19 is not shown in the drawing, which extension wires 32 are connected to a measuring transducer 33.

The invention is of course not restricted to the exemplary embodiment shown and described. Thus a sapphire thermometer, for example, may also be used instead of the thermocouple 34. Furthermore, the probe tube 1 and the sensor tube 19 may also be made of an SiC ceramic in another embodiment variant. The use of another suitable alloy for the support tube 6 and the flange 13 is also conceivable within the scope of the invention. The number of throughflow passages 3a, b is also not restricted to two in accordance with the invention.

| LIST OF DESIGNATIONS | |
| --- | --- |
| 1 | High-temperature probe |
| 2 | Probe tube |
| 2a | Bore for sensor tube |
| 2b | Bore for support tube |
| 3a | Throughflow passage |
| 3b | Throughflow passage |
| 3c | Inflow passage |
| 3d, e | Outflow passage |
| 4 | Enlarged bore |
| 5a | Tip of the probe tube |
| 5b | Foot of the probe tube |
| 6 | Support tube |
| 6a, b | Outside diameter of the support tube |
| 7 | Bore |
| 8 | Ring |
| 9 | Supporting rings |
| 10a, b | Air-inlet opening |
| 11 | Internal thread of the support tube |
| 12 | Tubular socket |
| 12a | Bore |
| 13 | Flange |
| 14 | Flange |
| 15a, b | Air-inlet opening |
| 17 | Helical compression spring |
| 18 | Screw |
| 19 | Sensor tube |
| 20 | Sensor tip |
| 21 | Bayonet catch |
| 22 | Helical compression spring |
| 23 | Cooling-air flow |
| 23a, b | Cooling-air flow |
| 24 | Hot-gas flow |
| 25 | Hot-gas casing wall |
| 26 | Hot-gas zone |
| 27 | Plenum |
| 28 | Tip of the support tube |
| 29 | Tubular socket |
| 30 | Opening in the hot-gas casing wall |
| 31 | Tubular socket |
| 31a | Bore |
| 32 | Extension wires |
| 33 | Measuring transducer |
| 34 | Thermocouple |

I claim:

1. A high-temperature probe, comprising:

a probe tube having an inner bore, the inner bore extending parallel to a direction of an axis of the probe tube, the probe tube having a measuring space, the measuring space being in the form of a flow-through passage oriented transversely to the direction of the probe tube axis, located at a bottom end thereof, the probe tube having a second inner bore parallel to the first inner bore;

a ceramic sensor tube disposed in the inner bore of the probe tube;

a temperature sensor having a sensor tip disposed in the measuring space for measuring a hot-gas flow in a hot-gas zone; and a ceramic support tube disposed in the second inner bore;

wherein the support tube is made of an oxide-dispersion-strengthened (OSD) superalloy and has a ring at one end, the diameter of the ring being greater than a diameter of the second inner bore, the ring being arranged in an enlarged bore at the bottom end of the probe tube, the enlarged bore being in communication with the second inner bore.

2. A high-temperature probe according to claim 1, wherein the temperature sensor includes a thermocouple.

3. A high-temperature probe according to claim 1, wherein the temperature sensor includes a thermometer.

4. A high-temperature probe, comprising:

a probe tube having an inner bore, the inner bore extending parallel to a direction of an axis of the probe tube, the probe tube having a measuring space, the measuring space being in the form of a flow-through passage oriented transversely to the direction of the probe tube axis, located at a bottom end thereof, the probe tube having a second inner bore parallel to the first inner bore;

a ceramic sensor tube disposed in the inner bore of the probe tube;

a temperature sensor having a sensor tip disposed in the measuring space for measuring a hot-gas flow in a hot-gas zone;

a ceramic support tube disposed in the second inner bore; and a flange, the flange separating the hot-gas zone from a plenum, the flange having a tubular socket on the hot-gas zone, a tube tip of the probe tube being disposed in the tubular socket, the flange having a support tube bore and a sensor tube bore extending through a tubular support tube socket and a tubular sensor tube socket on a plenum side of the flange, the support tube and the sensor tube extending through the support tube bore and the sensor tube bore, respectively, and projecting from the hot-gas zone into the plenum wherein a tip of the support tube is disposed in the plenum and has an internal thread, and air-inlet openings leading to a bore of the support tube are arranged below the internal thread.

5. A high-temperature probe according to claim 4, wherein the tubular support tube socket has air-inlet openings disposed radially next to the air-inlet openings of the support tube, the tubular support tube socket having a flange at an end thereof disposed above the air-inlet openings.

6. A high-temperature probe according to claim 5, wherein a helical compression spring (17) is mounted in a preloaded manner between the flange of the support tube socket and a screw which is disposed in the internal thread of the support tube.

7. A high-temperature probe according to claim 4, further comprising a hot-gas casing wall, the flange being fastened with a bayonet catch in the plenum to an opening in the hot-gas casing wall.

8. A high-temperature probe according to claim 4, wherein the temperature sensor includes a thermocouple.

9. A high-temperature probe according to claim 4, wherein the temperature sensor includes a thermometer.

* * * * *